US008441595B2

(12) United States Patent
Noh

(10) Patent No.: US 8,441,595 B2
(45) Date of Patent: May 14, 2013

(54) LIGHT EMITTING DEVICE AND DISPLAY DEVICE HAVING THE SAME

(75) Inventor: Ki-Hyun Noh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 465 days.

(21) Appl. No.: 12/828,587

(22) Filed: Jul. 1, 2010

(65) Prior Publication Data

US 2011/0141392 A1 Jun. 16, 2011

(30) Foreign Application Priority Data

Dec. 11, 2009 (KR) ........................ 10-2009-0123324

(51) Int. Cl.
*G02F 1/1335* (2006.01)

(52) U.S. Cl.
USPC ............................................... 349/61; 257/88

(58) Field of Classification Search ........................ None
See application file for complete search history.

(56) References Cited

U.S. PATENT DOCUMENTS 7,247,982 B2 7/2007 Ohshita et al.
7,635,635 B2 12/2009 Yilmaz et al.

FOREIGN PATENT DOCUMENTS

| | | |
|---|---|---|
| JP | 2001-357788 | 12/2001 |
| JP | 2004-158321 | 6/2004 |
| JP | 2005-197001 | 7/2005 |
| KR | 10-2000-0073836 | 12/2000 |
| KR | 10-2009-0015915 | 2/2009 |

*Primary Examiner* — Lucy Chien
(74) *Attorney, Agent, or Firm* — Christie, Parker & Hale, LLP

(57) ABSTRACT

A light emitting device includes a vacuum vessel, a recess portion, a cathode electrode, an electron emission region, a gate electrode, and a gate terminal portion. The vacuum vessel includes a first substrate, a second substrate facing the first substrate, and a sealing member disposed between the first substrate and the second substrate. The recess portion is formed to be depressed along a direction on a surface of the first substrate facing the second substrate, and the cathode electrode is formed in the recess portion and extending along the one direction. The electron emission region is formed on the cathode electrode within the recess portion. The gate electrode includes a metal plate on the surface of the first substrate along a direction crossing the cathode electrode at an inner side of the sealing member. The gate terminal portion is formed on the surface of the first substrate on inner and outer sides of the sealing member, traversing under the sealing member and is electrically connected with the gate electrode. The gate terminal portion includes a conductive film having a thickness smaller than a thickness of the gate electrode.

17 Claims, 8 Drawing Sheets

101

102

LIGHT EMITTING DEVICE AND DISPLAY DEVICE HAVING THE SAME

CROSS-REFERENCE TO RELATED APPLICATION

This application claims the benefit of Korean Patent Application No. 10-2009-0123324, filed Dec. 11, 2009 in the Korean Intellectual Property Office, the disclosure of which is incorporated herein by reference.

BACKGROUND

1. Field

The described technology relates generally to a light emitting device and a display device having the same and, more particularly, to a light emitting device using a field emission principle and a display device having the same.

2. Description of the Related Art

A type of a light emitting device is one that emits electrons by using a field emission principle to excite a phosphor layer to emit light. The light emitting device includes a driving electrode and an electron emission region on a surface of a rear substrate, and an anode electrode and a phosphor layer on a surface of a front substrate. In the light emitting device, the edges of the front substrate and the rear substrate are integrally attached by a sealing member. Air is exhausted from the internal space between the front substrate and the rear substrate in order to create a vacuum vessel having the sealing member.

The driving electrode includes cathode electrodes, and gate electrodes formed to cross the cathode electrodes. An insulating layer is positioned between the cathode electrodes and the gate electrodes. An opening is formed through the gate electrodes and the insulating layer at every crossing of the cathode electrodes and the gate electrodes to expose the cathode electrodes. Electron emission regions are positioned above the openings exposing the cathode electrodes.

However, in the foregoing structure, when the light emitting device operates, the surface of the insulating layer is charged with electric charges, lowering withstanding voltage characteristics between the cathode electrodes and the gate electrodes and degrading the driving stability of the light emitting device. Also, after coating a conductive film on the cathode electrodes and the gate electrodes, a patterning of the conductive film is performed. Additionally, an etching process forming the opening and a fine patterning process forming electron emission regions are also performed. In other words, a fabrication method, as described above, is very complicated.

To avoid these problems, the light emitting device is alternately fabricated such that the rear substrate is deformed to omit an insulating layer and gate electrodes are fabricated in advance with a metal plate and bonded in a parallel manner on the rear substrate. A plurality of openings are formed on the gate electrodes to allow electrons to pass therethrough at each pixel area. An end portion of each of the gate electrodes is exposed to an outer side of the sealing member so as to serve as a terminal portion receiving a driving voltage. In this case, however, in the sealing process integrally bonding the front and rear substrates with the sealing member, a fine gap is formed at the sealing member due to the gate electrodes overlapping with the sealing member, causing a defective bonding. Namely, as the gate electrodes are formed of a metal plate having a relatively large thickness, the sealing member fails to densely fill between the gate electrodes, making the bonding defective. As a result, a defective product may be fabricated exhausting air from between the front and rear substrates after the sealing process.

The above information disclosed in this Background section is only for enhancement of understanding of the background of the described technology and therefore it may contain information that does not form the prior art that is already known in this country to a person of ordinary skill in the art.

SUMMARY

Aspects of the present invention provide a light emitting device preventing a defective bonding of a sealing member due to the presence of gate electrodes and preventing a vacuum leakage as a result of a defective bonding, and a display device having the light emitting device.

Aspects of the present invention provide a light emitting device including: a vacuum vessel, a recess portion, a cathode electrode, an electron emission region, a gate electrode, and a gate terminal portion. The vacuum vessel may include: a first substrate, a second substrate facing the first substrate and a sealing member disposed between the first substrate and the second substrate. The recess portion may be formed to be depressed along one direction on a surface of the first substrate, and the cathode electrode may be formed in the recess portion extending along the one direction. The electron emission region may be formed on the cathode electrode within the recess portion. The gate electrode may include a metal plate on the surface of the first substrate along a direction crossing the cathode electrode at an inner side of the sealing member. The gate terminal portion may be formed on the surface of the first substrate on inner and outer sides of the sealing member, traversing under the sealing member and may be electrically connected with the gate electrode. The gate terminal portion may include a conductive film having a thickness smaller than a thickness of the gate electrode.

According to another aspect of the present invention, the gate electrode may have a thickness larger than that of the cathode electrode, and may include one or more of aluminum (Al), nickel (Ni), and iron (Fe). The gate electrode may be fixed to the surface of the first substrate through anode bonding, and a metal oxide film may be formed on the interface between the first substrate and the gate electrode.

According to another aspect of the present invention, the gate terminal portion may include a first area positioned at the inner side of the sealing member, a second area overlapped by the sealing member, and a third area positioned at the outer side of the sealing member and receiving a driving voltage. The gate terminal portion may overlap with the gate electrode at the first area and contact a surface of the gate electrode.

According to another aspect of the present invention, the light emitting device may further include: a spacer disposed at an area where the gate electrode and the gate terminal portion overlap and applies pressure to the gate electrode.

According to another aspect of the present invention, the gate terminal portion may include at least one opening in an area overlapping the gate electrode, and the gate electrode may be fixed to a portion of the first substrate exposed by the opening through anode bonding.

According to another aspect of the present invention, the gate terminal portion may be formed through one of vacuum deposition, sputtering, and screen printing. The gate terminal portion may be made of a same material as that of the cathode electrode and may be simultaneously formed when the cathode electrode is formed.

According to another aspect of the present invention, the gate electrode may include a mesh region including openings allowing electron beams to pass therethrough and a support region fixed to one surface of the first substrate. A sum of a thickness of the cathode electrode and a thickness of the electron emission region may be smaller than a depth of the recess portion.

According to another aspect of the present invention, the light emitting device may further include: an anode electrode, a phosphor layer, and a reflective layer positioned on a surface of the second substrate.

Aspects of the present invention provide a display device including: a display panel displaying an image upon receiving light; and a light emitting device disposed below the display panel and providing light to the display panel, the light emitting device having a structure as described above.

According to another aspect of the present invention, the display panel may include first pixels, wherein the light emitting device may include a smaller number of second pixels than the first pixels, and wherein the second pixels may emit light independently correspondingly according to a gray level of the first pixels. The display panel may be a liquid crystal display panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
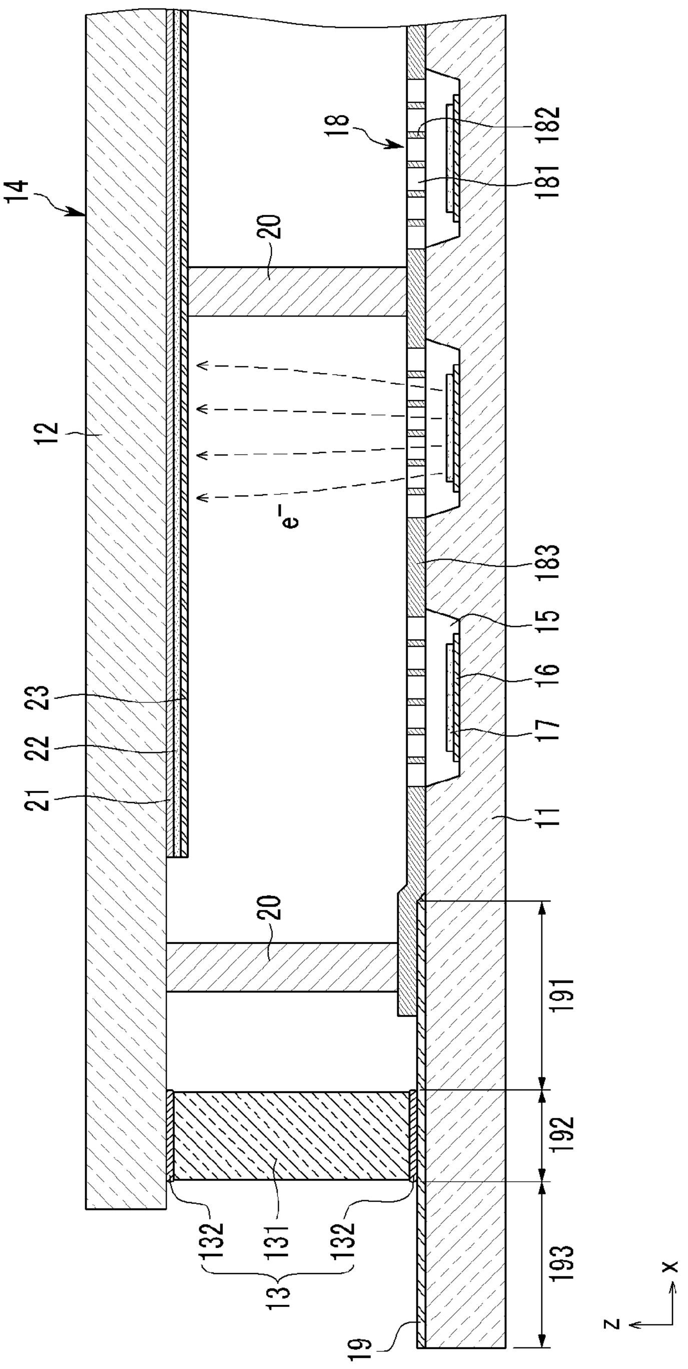
FIG. 1 is a partial cross-sectional view of a light emitting device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
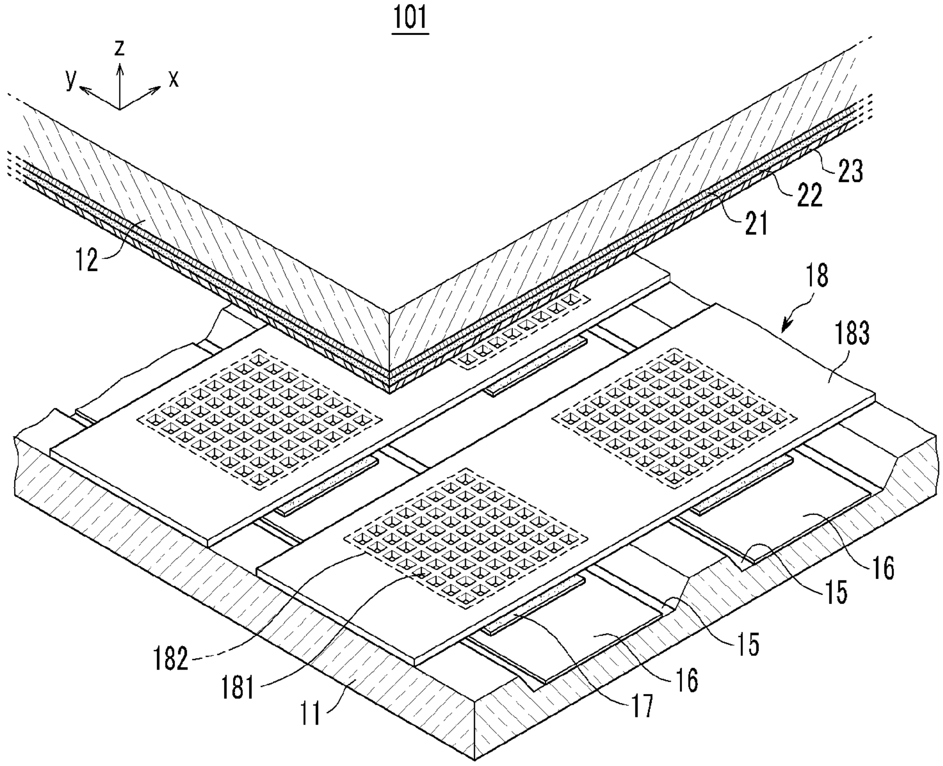
FIG. 2 is a perspective view illustrating a light emission area of the light emitting device of FIG. 1.

FIG. 1 is a partial cross-sectional view of a light emitting device according to an embodiment of the present invention, and FIG. 2 is a perspective view illustrating a light emission area of the light emitting device of FIG. 1. With reference to FIG. 2, a light emitting device 101 includes a first substrate 11, a second substrate 12 disposed to face the first substrate 11, and a sealing member 13. The sealing member 13 is disposed at edges of the first and second substrates 11 and 12 between the both substrates 11 and 12 and integrally bonded to the both substrates 11 and 12. An internal space between the first and second substrates 11 and 12 sealed by the sealing member 13 is exhausted of air to have a vacuum degree of substantially $10^{-6}$ Torr, constituting a flat vacuum vessel 14.

The first substrate 11 includes recess portions 15 formed to be separated at intervals on a surface of the first substrate 11 that faces towards the second substrate 12. The recess portions 15 are formed to have a depth and have a stripe pattern (i.e., a channel) along a direction of the first substrate 11. The recess portions 15 are formed by removing portions of the first substrate 11 through an etching process, a sand blast process, or other similar processes. The recess portions 15 have a sloped side wall or a vertical side wall. FIGS. 1 and 2 illustrate the recess portions 15 with a sloped side wall. However, aspects of the present invention are not limited thereto and the recess portions 15 may have other suitable sidewall shapes.

The first substrate 11 is a glass substrate and has a thickness of approximately 1.8 mm. In this case, the recess portions 15 are formed to have a depth of approximately 40 μm and a width of approximately 300 μm to 600 μm. However, aspects of the present invention are not limited thereto, and the thickness of the first substrate 11 and the depth of the recess portions 15 may be of other suitable thicknesses and depths, respectively. Further, the first substrate 11 can be made of non-glass material.

A cathode electrode 16 and an electron emission region 17 are positioned on the bottom surface of each recess portion 15. The cathode electrodes 16 are formed on a bottom surface of the recess portions 15 and are formed in a stripe pattern having the stripes extending in a direction parallel to a direction in which the recess portions 15 extend. The electron emission regions 17 are formed on the cathode electrodes 16. The electron emission regions 17 may be formed to be parallel to the cathode electrodes 16 in a stripe pattern. However, aspects of the present invention are not limited thereto and the electron emission regions 17 may be configured such that one of the electron emission regions 17 is formed at every crossing of the cathode electrodes 16 and gate electrodes 18 without being formed between adjacent crossings. FIG. 2 shows electron emission regions 17 formed at the crossings of the cathode electrodes 16 and the gate electrodes 18.

The electron emission regions 17 contain materials, such as a carbon-based material or a nanometer-size material, which emit electrons when an electric field is applied thereto in a vacuum state. The electron emission regions 17 include at least one of carbon nanotube (CNT), graphite, graphite nanofiber, diamond-like carbon, fullerene ($C_{60}$), and silicon nanowire, and are formed through a thick film process such as screen printing. However, aspects of the present invention are not limited thereto, and the electron emission regions 17 may include other suitable materials or be formed through other suitable processes. The sum of a thickness of the cathode electrode 16 and a thickness of the electron emission region 17 is smaller than the depth of the recess portion 15. Thus, the cathode electrode 16 and the electron emission region 17 are positioned to be lower than a surface of the first substrate 11 where the recess portion 15 is not formed. In other words, the electron emission region 17, which is disposed on the cathode electrode 16, does not extend above the surface of the first substrate 11 in which the recess portion 15 is formed. A portion of the first substrate 11 between the recess portions 15 serves as a fence demarcating the cathode electrodes 16. The portion of the first substrate 11 between the recess portions 15 extends from a bottom of respective recess portions 15 to a surface of the first substrate 11 and is in the shape of and may be referred to as a mesa.

The gate electrode 18 is formed of a metal plate having a thickness larger than that of the cathode electrode 16. The gate electrode 18 includes a mesh region 182 including openings 181 allowing electron beams to pass therethrough and a support region 183 surrounding the mesh region 182. The gate electrode 18 is fabricated through a process of cutting a metal plate in a stripe form and then removing portions of the metal plate through etching or the like to form the openings 181. However, aspects of the present invention are not limited thereto, and the gate electrode 18 may be fabricated through different processes.

The gate electrode 18 is formed to have a thickness of approximately 50 μm and a width of approximately 10 mm, and includes one or more of aluminum (Al), nickel (Ni), and iron (Fe). However aspects of the present invention are not limited thereto, and the thickness, width, and material of the gate electrode 18 may be of other suitable values and materials.

The gate electrode 18 is fabricated in advance through a separate process from that of the cathode electrode 16 and the electron emission region 17, and then fixed on the first substrate 11 along the direction crossing the cathode electrode 16. Specifically, the gate electrode 18 is disposed on the first substrate 11 such that the mesh region 182 faces the electron emission region 17 and the support region 183 contacts the surface of the first substrate 11 between the recess portions 15. Accordingly, the gate electrode 18 is separated from the electron emission region 17 in a direction along which the gate electrode 18 and the electron emission region 17 are stacked (i.e., a z-axis direction in FIG. 2) on the first substrate 11. As the gate electrode 18 is fixed on the first substrate 11, it is automatically insulated from the electron emission region 17 and the cathode electrode 16.

The gate electrode 18 is fixed to the first substrate 11 through anode bonding. The anode bonding is a process used to bond silicon wafers or silicon and glass and is performed such that objects intended to be bonded are brought into contact with each other and an electric field is applied thereto at a temperature of 450 degrees Celsius. However, aspects of the present invention are not limited thereto, and other processes may be used to bond the gate electrode 18 to the first substrate 11. The process of fixing the gate electrode 18 on the first substrate 11 through the anode bonding will now be described in detail.

First, the first substrate 11 is disposed on a stage (not shown) with junction electrodes positioned thereon. The gate electrodes 18 are disposed on the first substrate 11. Next, the first substrate 11 and the gate electrodes 18 are heated to a high temperature, and an electric field is then applied to between the junction electrodes (not shown) of the stage (not shown) and the gate electrodes 18. Then, sodium positive ions (or sodium cations) and oxygen anions (or negative oxygen ions, or oxyanions) are separated in the mutually opposite directions within the first substrate 11. Specifically, the sodium positive ions move toward the junction electrodes (not shown) of the stage (not shown), while the oxygen anions move toward the gate electrodes 18.

The gate electrodes 18 contain aluminum (Al). Accordingly, the aluminum of the gate electrodes 18 and the oxygen anions of the first substrate 11 react with each other to form aluminum oxide film on the interface between the first substrate 11 and the gate electrodes 18. The aluminum oxide film serves to bond the first substrate 11 and the gate electrodes 18. If the gate electrodes 18 contain any other metal, the type of the metal oxide film would differ.

Because the gate electrodes 18 are directly fixed on the first substrate 11 without any intermediate element (such as an adhesive layer or the like), the bonding force of the gate electrodes 18 can be strengthened. Also, because there is no event such as melting an adhesive layer in a subsequent heat treatment, misalignment of the gate electrodes 18 can be largely prevented.

The mesh region 182 of the gate electrode 18 may also be positioned at a portion where the gate electrode 18 does not cross the cathode electrode 16 as well as at the portion where the gate electrode 18 crosses the cathode electrode 16. In other words, one mesh region 182 is provided on the gate electrode 18, and a portion of the mesh region 182 is directly fixed on the first substrate 11. In this case, when the gate electrode 18 is disposed on the first substrate 11, alignment characteristics with the electron emission region 17 may not be a significant factor in forming the light emitting device 101, thus providing a more process leeway.

The gate electrodes 18 are positioned at an inner side of the sealing member 13, and receive a voltage required for their driving by a gate terminal portion 19. The gate terminal portion 19 extends from the gate electrode 18, traverses the sealing member 13, up to the edge of the first substrate 11. Specifically, in the light emitting device 101 according to the present exemplary embodiment, the gate terminal portion 19 is provided and made of a material different from that of the gate electrode 18, rather than extending a portion of the gate electrode 18 to the outer side of the sealing member 13.

Figure 3:
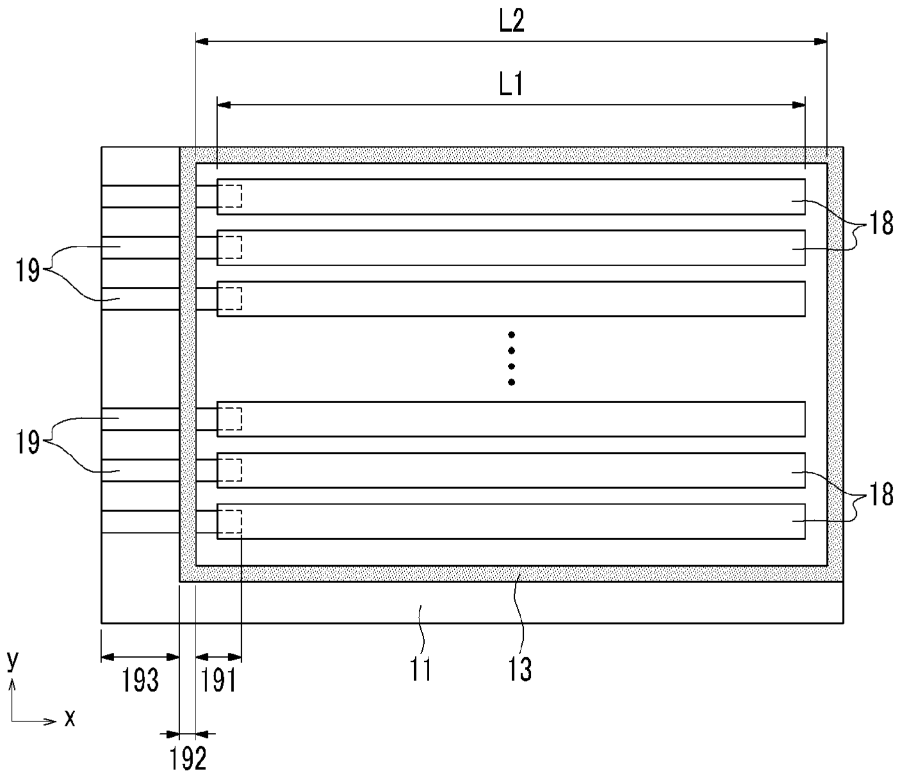
FIG. 3 is a plan view schematically showing a first substrate, a gate electrode, a gate terminal portion, and a sealing member of the light emitting device illustrated in FIG. 1.
Figure 4:
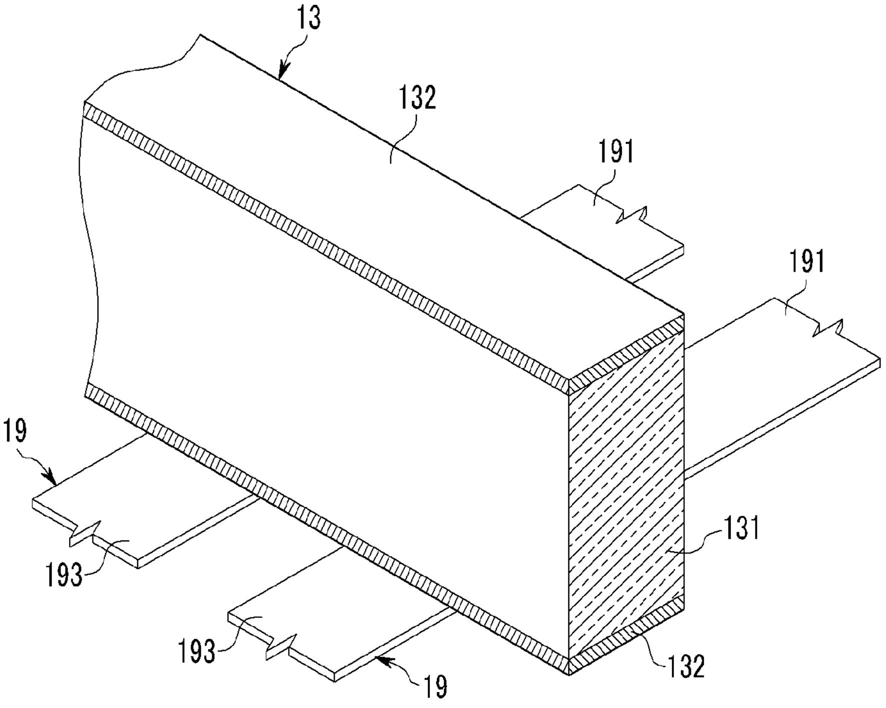
FIG. 4 is a perspective view showing the gate terminal portion and the sealing member of the light emitting device illustrated in FIG. 3.

FIG. 3 is a plan view schematically showing a first substrate 11, a gate electrode 18, a gate terminal portion 19, and a sealing member 13 of the light emitting device 101 illustrated in FIG. 1. FIG. 4 is a perspective view showing the gate terminal portion 19 and the sealing member 13 of the light emitting device 101 illustrated in FIG. 3. A length L1 of the gate electrode 18 is smaller than an internal width L2 of the sealing member 13 measured along a lengthwise direction of the gate electrode 18. Accordingly, the gate electrode 18 is positioned at an inner side of the sealing member 13 and spaced apart from the sealing member 13. The gate terminal portion 19 is formed between the gate electrode 18 and an edge of the first substrate 11. A same number of gate terminal portions 19 as that of the gate electrodes 18 is provided. One gate terminal portion 19 is provided for every gate electrode 18.

The gate terminal portions 19 are formed in a stripe pattern parallel to the gate electrodes 18. The gate terminal portions 19 include a first area 191 positioned at the inner side of the sealing member 13, a second area 192 overlapped by the sealing member 13, and a third area 193 positioned at an outer side of the sealing member 13. A portion of the first area 191 overlaps the gate electrodes 18. The gate terminal portions 19 contact surfaces of the gate electrodes 18. Thus, the gate terminal portions 19 receive driving voltages from the third area 193 and transfer the driving voltages to the gate electrodes 18.

With reference to FIGS. 1, 2 and 3, a spacer 20 is disposed at the area where the gate electrode 18 and the gate terminal portion 19 overlap with each other. The spacer 20 provides pressure to the gate electrode 18, serving to reliably connect the gate electrode 18 to the gate terminal portion 19. The gate terminal portion 19 is formed of a conductive film. Namely, unlike the gate electrode 18 formed of a metal plate, the gate terminal portion 19 is formed as a certain film through processes including vacuum deposition, sputtering, and screen printing. However, aspects of the present invention are not limited thereto and the gate terminal portion may be formed by other suitable processes. Thus, the gate terminal portion 19 has a thickness smaller than that of the gate electrode 18, and the thickness of the gate terminal portion 19 may range, from 5 μm to 10 μm. The gate terminal portion 19 contains silver (Ag). However, aspects of the present invention are not limited thereto and the gate terminal portion 19 may be formed to have other suitable thicknesses and may contain other suitable metals.

The gate terminal portion 19 may be made of the same material as that of the cathode electrode 16 and may be formed at the same time when the cathode electrode 16 is formed. In this case, after the gate terminal portion 19 is formed, the gate electrode 18 is fixed on the first substrate 11, so that the gate electrode 18 is disposed on the gate terminal portion 19 at the first area 191 of the gate terminal portion 19. In other words, an upper surface of the gate terminal portion 19 and a lower surface of the gate electrode 18 are in contact with each other at the first area 191.

The first and second substrates 11 and 12 are integrally bonded by the sealing member 13, and the internal space therebetween is air-exhausted to form the vacuum vessel 14 together with the sealing member 13. The sealing member 13 includes a frame 131 made of a hard material, such as glass, and frit junction layers 132 formed on both sides of the frame 131 between the first and second substrates 11 and 12. However, aspects of the present invention are not limited thereto, and the sealing member 13 may be entirely formed as a frit junction layer 132. In FIG. 1, the sealing member 13 is illustrated to include the frame 131 and the frit junction layers 132.

A sealing process includes disposing the sealing member 13 and the second substrate 12 on the first substrate 11, firing the frit junction layers 132 is fired to melt the frit junction layers 132. The frit junction layers 132 are then cooled at room temperature to harden the frit junction layers 132. In this case, because, rather than the gate electrode 18, the gate terminal portion 19 is overlapped by the sealing member 13, the frit junction layers 132 can densely fill in between the gate terminal portions 19 owing to a thinness of the gate terminal portions 19, as shown in FIG. 4. Accordingly, a defective bonding of the sealing member 13 can be prevented. This is because the defecting bonding may otherwise be caused by a fine gap otherwise generated between the sealing member 13 and the first substrate 11, or between the sealing member 13 and the gate terminal portion 19 in the sealing process. As a result, a vacuum leakage, occurring while exhausting air from between the first and second substrates 11 and 12, can be prevented in order to stably secure a vacuum degree of the vacuum vessel 14.

With reference to FIGS. 1 and 2, an anode electrode 21 and a phosphor layer 22 are positioned on a surface of the second substrate 12 facing the first substrate 11. The anode electrode 21 is formed of a transparent film made of a material such as indium tin oxide (ITO) or indium zinc oxide (IZO) to allow visible light emitted from the phosphor layer 22 to transmit therethrough. However, aspects of the present invention are not limited thereto, and the anode electrode 21 may be formed of other suitable materials. The anode electrode 21 is an accelerating electrode that attracts electron beams. The anode electrode, upon receiving a DC voltage (anode voltage) of hundreds or thousands of volts, maintains the phosphor layer 22 in a high potential state.

The phosphor layer 22 is formed as a mixture of red, green, and blue phosphors to emit white light. However, aspects of the present invention are not limited thereto and the phosphor layer 22 may be formed as just one type of phosphor or any combination of phosphors. The phosphor layer 22 is positioned on an entire light emitting area of the second substrate 12, or a plurality of phosphor layers may be provided such that one phosphor layer corresponds to each crossing of the cathode electrode 16 and the gate electrode 18. In FIGS. 1 and 2, the single phosphor layer 22 is illustrated to be formed on the entire light emitting area.

The phosphor layer 22 is covered by a reflective layer 23. The reflective layer 23 is formed as an aluminum thin film having a thickness of thousands of angstroms (Å) and includes fine holes allowing electron beams to pass therethrough. The reflective layer 23 reflects visible light emitted toward the first substrate 11 from the phosphor layer 22. The visible light is reflected by the reflective layer 23 towards the second substrate 12 to enhance the luminance of the light emitting device 101. However, aspects of the present invention are not limited thereto, and the transparent anode electrode 21 may be omitted and the reflective layer 23 may serve as an anode electrode upon receiving an anode voltage.

The spacers 20 are positioned between the first and second substrates 11 and 12 in order to support a compressive force applied to the vacuum vessel 14. Thus, the spacers 20 uniformly maintain a gap between the first and second substrates 11 and 12. The spacers 20 are evenly distributed in the light emitting area, and in particular, the spacers 20 is also provided at a portion where the gate terminal portion 19 and the gate electrode 18 overlap in order to apply pressure to the gate electrode 18.

Accordingly, the adhesive force between the gate terminal portion 19 and the gate electrode 18 can be increased in order to minimize a contact resistance between the gate terminal portion 19 and the gate electrode 18. Also, because the gate terminal portion 19 and the gate electrode 18 are connected without any intermediate such as an adhesive or the like, the fabrication process of the light emitting device 101 can be simplified.

The light emitting device 101 is driven by applying a scan voltage to one of the cathode electrodes 16 and the gate electrodes 18 and a data voltage is applied to another one of the cathode electrodes 16 and the gate electrodes 18. For example, the scan voltage is applied to the gate electrodes 18 and the data voltage is applied to the cathode electrodes 16.

Then, a field is formed around the electron emission regions 17 in pixels having a voltage difference between the cathode electrodes 16 and the gate electrodes 18 larger than a threshold value, and electrons are emitted from the field. The emitted electrons are attracted by the anode voltage and collide with the phosphor layer 22 so that the phosphor layer 22 emits light. Here, pixels correspond to crossings of the cathode electrodes 16 and the gate electrodes 18, and a luminance of the phosphor layer 22 of each pixel corresponds to an emission amount of electron beams of corresponding pixels.

Figure 5:
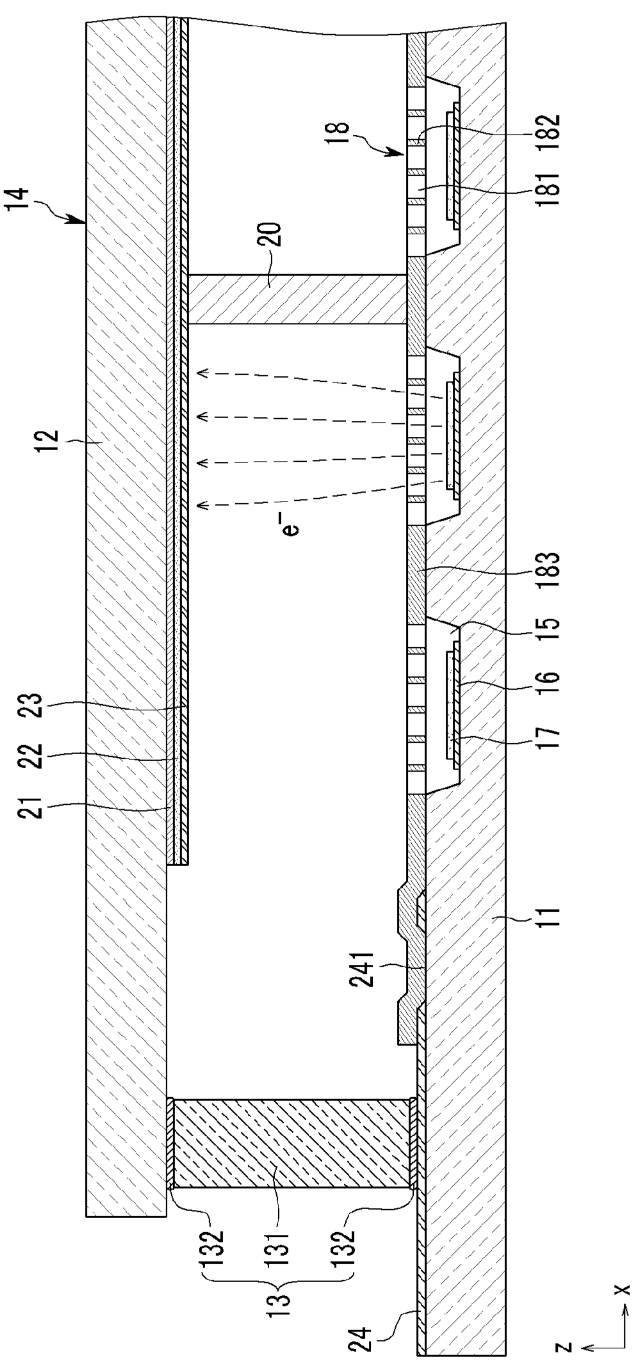
FIG. 5 is a partial cross-sectional view of a light emitting device according to an embodiment of the present invention.
Figure 6:
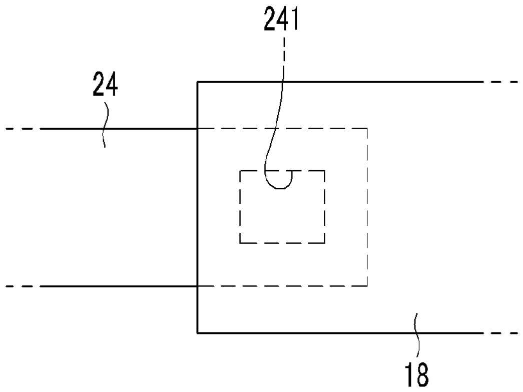
FIG. 6 is a partial top plan view showing the gate terminal portion and the gate electrode of the light emitting device illustrated in FIG. 5.

FIG. 5 is a partial cross-sectional view of a light emitting device 102 according to a an exemplary embodiment, and FIG. 6 is a partial top plan view showing the gate terminal portion 24 and the gate electrode 18 of the light emitting device 102 illustrated in FIG. 5. In the following description and present embodiment of the present invention, elements in the light emitting device 102 other than the gate terminal portion 24 and the gate electrode 18 are the same as those of the light emitting device 101 according to the previous exemplary embodiment shown in FIGS. 1 through 4, and thus, the same reference numerals are used for the same elements and a description thereof will be omitted.

With reference to FIGS. 5 and 6, in the light emitting device 102, the gate terminal portion 24 includes at least one opening 241 formed at a region where the gate terminal portion 24 overlaps with the gate electrode 18. The opening 241 exposes the first substrate 11. When the gate electrode 18 is fixed to the first substrate 11 through the anode bonding as described above, the gate electrode 18 is also fixed to the portion of the first substrate 11 exposed by the opening 241. Thus, the gate terminal portion 24 is naturally pressurized by the bonding force between the first substrate 11 and the gate electrode 18.

Therefore, without using a spacer at a region where the gate terminal portion 24 and the gate electrode 18 overlap, an adhesive force between the gate terminal portion 24 and the gate electrode 18 can be increased in order to minimize a contact resistance between the gate terminal portion 24 and the gate electrode 18. Also, because the gate terminal portion 24 and the gate electrode 18 are connected without an intermediate element such as an adhesive or the like, the fabrication process of the light emitting device 102 can be simplified.

Figure 7:
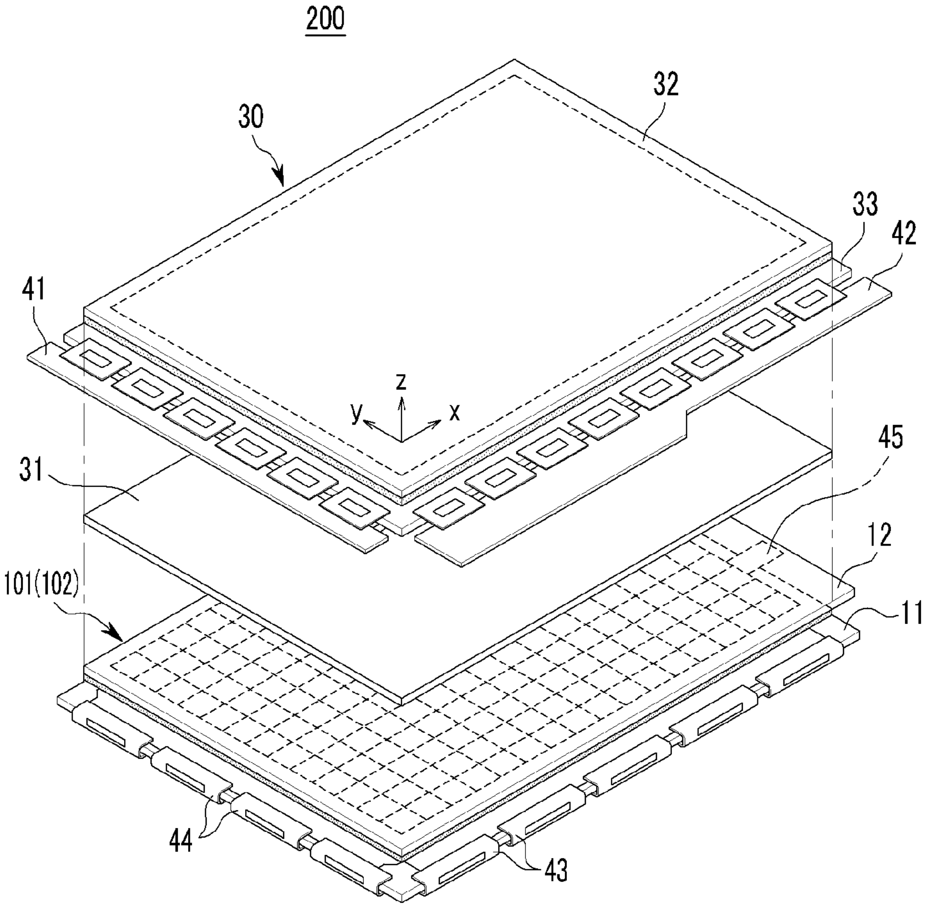
FIG. 7 is an exploded perspective view of a display device according to an embodiment of the present invention.

FIG. 7 is an exploded perspective view of a display device 200 according to an embodiment of the present invention. With reference to FIG. 7, the display device 200 includes one of the light emitting devices 101 or 102, and the light emitting device 101 or 102 of the display device 200 functions as a backlight unit. The display device 200 also includes a display panel 30 positioned in front of the light emitting device 101 or 102. A diffuser 31 is positioned between the light emitting device 101 or 102 and the display panel 30. The light emitting device 101 or 102 and the diffuser 31 are spaced apart from each other. The display panel 30 is a liquid crystal display panel.

Figure 8:
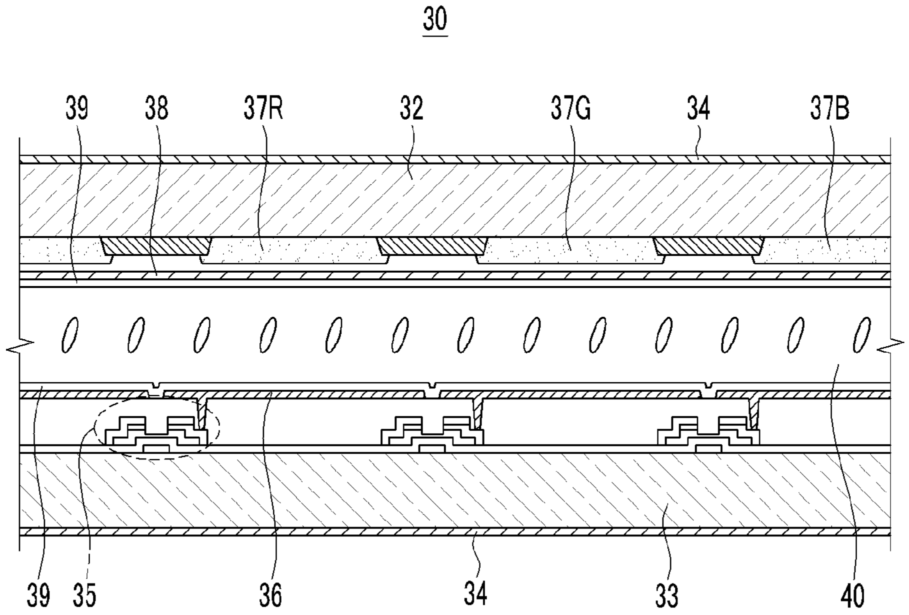
FIG. 8 is a partial cross-sectional view of a display panel of the display device illustrated in FIG. 7.

FIG. 8 is a partial cross-sectional view of the display panel of the display device illustrated in FIG. 7. With reference to FIG. 8, the display panel 30 includes an upper substrate 32 and a lower substrate 33, a pair of polarizers 34, a plurality of thin film transistors (TFTs) 35, pixel electrodes 36, color filter layers 37R, 37G, and 37B, a common electrode 38, a pair of alignment films 39, and a liquid crystal layer 40.

The polarizers 34 are attached on outer surfaces of the upper substrate 32 and the lower substrate 33, respectively. The plurality of TFTs 35 is formed on an inner surface of the lower substrate 33, and the pixel electrodes 36 are electrically connected with the respective TFTs 35. The color filter layers 37R, 37G, and 37B are formed on an inner surface of the upper substrate 32, and the common electrode 38 covers the color filter layers 37R, 37G, and 37B. The pair of alignment films 39 cover the pixel electrodes 36 and the common electrode 38, respectively, and the liquid crystal layer 40 is injected between the upper substrate 32 and the lower substrate 33.

One TFT 35 and one pixel electrode 36 are disposed at every subpixel of the display panel 30. The color filter layers 37R, 37G, and 37B include a red filter layer 37R, a green filter layer 37G, and a blue filter layer 37B, each corresponding to one of the pixel electrodes 36, respectively. In the display panel 30, each pixel includes red, green, and blue subpixels.

When the TFT 35 of a particular subpixel is switched on, an electric field is formed between the pixel electrode 36 and the common electrode 38, changing an alignment angle of liquid crystal molecules. Light transmittance from the pixel varies according to the change in the alignment angle of the liquid crystal molecules. The luminance and light emission color of the pixels are controlled in this manner to display a certain image on the display panel 30.

With reference to FIG. 7, a gate printed circuit board (PCB) assembly 41 transmits a gate driving signal to gate electrodes (not shown) of each TFT, and a data PCB assembly 42 transmits a data driving signal to source electrodes (not shown) of each TFT. The light emitting device 101 or 102 includes a smaller number of pixels than that of the display panel 30, so that one pixel of the light emitting device 101 corresponds to a plurality of pixels of the display panel 30. Each pixel of the light emitting device 101 may emit light to correspond to a highest one of the gray levels of the corresponding pixels of the display panel 30, and may represent a gray scale of 2 bits to 8 bits.

The pixels of the display panel 30 are called first pixels, and the pixels of the light emitting device 101 are called second pixels The first pixels corresponding to a single second pixel are called a first pixel group, for the sake of brevity. Driving of the light emitting device 101 or 102 includes detecting, by a signal controller (not shown) controlling the display panel 30, the highest one of the gray levels of the first pixels constituting the first pixel group, and calculating a gray level required for making the second pixels emit light according to the detected gray level, and converting the same into digital data. The driving of the light emitting device 101 or 102 also includes generating a driving signal of the light emitting device 101 by using the digital data, and applying the generated driving signal to driving electrodes of the light emitting device 101.

The gate PCB assembly (not shown) and the data PCB assembly (not shown) driving the light emitting device 101 or 102 are positioned on a rear surface of the light emitting device 101 or 102. In FIG. 7, first connectors 43 connect the cathode electrodes (not shown) and the data PCB assembly (not shown), and second connectors 44 connect the gate electrodes (not shown) and the gate PCB assembly (not shown). A third connector 45 applies an anode voltage to the anode electrode.

In this manner, the second pixel of the light emitting device 101 or 102 is synchronized with the first pixel group when an image is displayed at the first pixel group, and emits light at a certain gray level. Namely, the light emitting device 101 provides light of high luminance to a brighter region of a screen image implemented by the display panel 30 and light of low luminance to a darker region of the screen image implemented by the display panel 30. Therefore, the display device 200, according to aspects of the present invention, can have an increased dynamic contrast ratio and implement high picture quality.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A light emitting device comprising:

a vacuum vessel, comprising:
- a first substrate;
- a second substrates facing the first substrate; and
- a sealing member disposed between the first substrate and the second substrate;

a recess portion formed along one direction on a surface of the first substrate facing the second substrate;

a cathode electrode formed in the recess portion and extending along the one direction;

an electron emission region formed on the cathode electrode within the recess portion;

a gate electrode comprising a metal plate and fixed to the surface of the first substrate along a direction crossing the cathode electrode at an inner side of the sealing member; and a gate terminal portion formed on the surface of the first substrate on the inner side and an outer side of the sealing member, traversing under the sealing member, and electrically connected with the gate electrode, the gate terminal portion comprising a conductive film having a thickness smaller than a thickness of the gate electrode.

2. The device of claim 1, wherein the thickness of the gate electrode is larger than that of the cathode electrode, and wherein the gate electrode comprises one or more of aluminum (Al), nickel (Ni), and iron (Fe).

3. The device of claim 2, wherein the gate electrode is fixed to the surface of the first substrate through anode bonding, and wherein a metal oxide film is formed on an interface between the first substrate and the gate electrode.

4. The device of claim 1, wherein the gate terminal portion comprises:

a first area positioned at the inner side of the sealing member;

a second area overlapped by the sealing member; and a third area positioned at the outer side of the sealing member and receiving a driving voltage.

5. The device of claim 4, wherein the gate terminal portion overlaps with the gate electrode at the first area and contacts a surface of the gate electrode.

6. The device of claim 5, further comprising a spacer disposed at an area where the gate electrode and the gate terminal portion overlap, wherein the spacer applies pressure to the gate electrode.

7. The device of claim 5, wherein the gate terminal portion has at least one opening in an area overlapping the gate electrode, and wherein the gate electrode is fixed to a portion of the first substrate exposed by the opening through anode bonding.

8. The device of claim 1, wherein the gate terminal portion is formed through one of vacuum deposition, sputtering, and screen printing.

9. The device of claim 8, wherein the gate terminal portion is made of a same material as that of the cathode electrode and is simultaneously formed when the cathode electrode is formed.

10. The device of claim 1, wherein the gate electrode comprises:

a mesh region having openings allowing electron beams to pass therethrough; and a support region fixed to one surface of the first substrate.

11. The device of claim 10, wherein a sum of a thickness of the cathode electrode and a thickness of the electron emission region is smaller than a depth of the recess portion.

12. The device of claim 1, further comprising:

an anode electrode;

a phosphor layer; and a reflective layer positioned on a surface of the second substrate.

13. A display device comprising:

a display panel displaying an image upon receiving light; and a light emitting device disposed below the display panel and providing light to the display panel, the light emitting device comprising:

a vacuum vessel comprising:

a first substrate;

a second substrate facing the first substrate; and a sealing member positioned between the first substrate and the second substrate;

a recess portion formed along one direction on a surface of the first substrate facing the second substrate;

a cathode electrode formed in the recess portion and extending along the one direction;

an electron emission region formed on the cathode electrode within the recess portion;

a gate electrode comprising metal and fixed to the surface of the first substrate along a direction crossing the cathode electrode at an inner side of the sealing member; and a gate terminal portion formed on the surface of the first substrate on the inner side and an outer side of the sealing member, traversing under the sealing member, and electrically connected with the gate electrode, the gate terminal portion comprising a conductive film having a thickness smaller than a thickness of the gate electrode.

14. The display device of claim 13, wherein the thickness of the gate electrode is larger than that of the cathode electrode, and wherein the gate electrode comprises one or more of aluminum (Al), nickel (Ni), and iron (Fe).

15. The display device of claim 14, wherein the gate electrode is fixed to the surface of the first substrate through anode bonding, and wherein a metal oxide film is formed on an interface between the first substrate and the gate electrode.

16. The display device of claim 13, wherein the display panel comprises:

first pixels, wherein the light emitting device comprises a smaller number of second pixels than the first pixels, and wherein the second pixels independently emit light correspondingly according to a gray level of the first pixels.

17. The display device of claim 13, wherein the display panel is a liquid crystal display panel.

* * * * *